Aug. 19, 1969    J. R. KAELIN    3,462,132
SYSTEM FOR SURFACE AERATION OF LIQUID
Filed Aug. 7, 1967
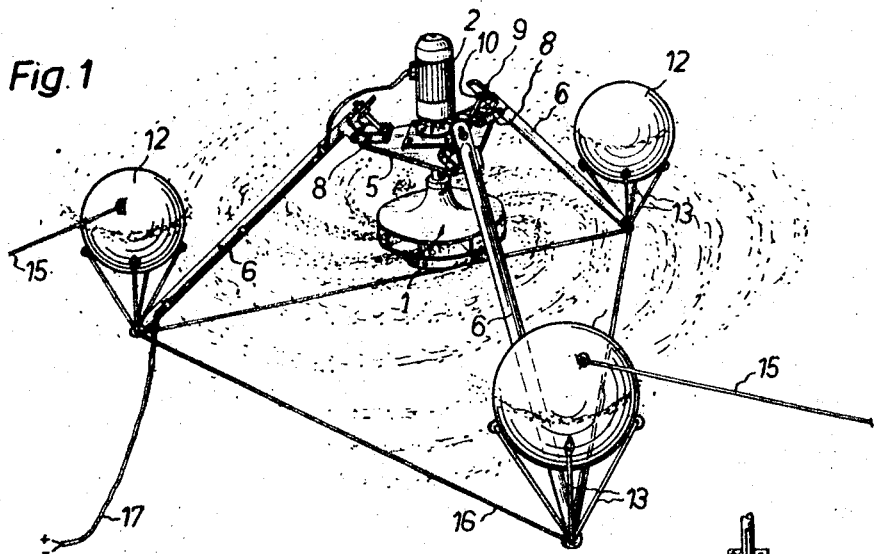
Fig. 1
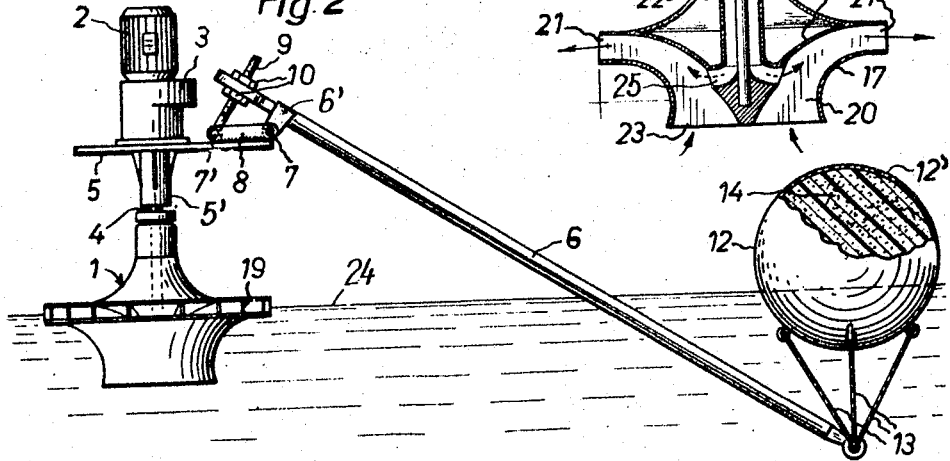
Fig. 2
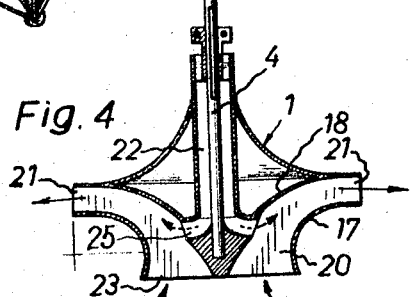
Fig. 4
Fig. 3
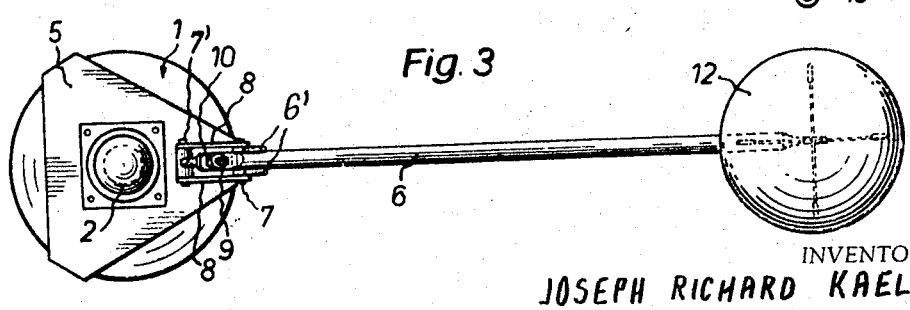
INVENTOR.
JOSEPH RICHARD KAELIN
BY United States Patent Office 3,462,132
Patented Aug. 19, 1969

3,462,132
SYSTEM FOR SURFACE AERATION OF LIQUID
Joseph Richard Kaelin, Villa Seeburg, Buochs,
Nidwalden, Switzerland
Filed Aug. 7, 1967, Ser. No. 658,766
Int. Cl. C02c 1/10; B01d 47/16
U.S. Cl. 261—87                                  3 Claims

ABSTRACT OF THE DISCLOSURE

A system for surface aeration of water, particularly for aeration or cleaning the water in rivers, lakes, creeks, or along beaches and shores, by means of an aeration rotor mounted on a floating carrier frame for at least partial immersion into the water to be aerated, said carrier frame being arranged to be anchored at any desired location along a shore where the water is to be aerated.

---

This invention relates to the aeration of water and is particularly, although not exclusively concerned with aeration or cleaning of the water in rivers, lakes, creeks or along beaches and shores by means of an aeration rotor or paddle wheel which is mounted on a substantially vertical axis for at least partial insertion in the water to be aerated.

Plants for surface aeration of liquid are known, which are particularly used in the activated-sludge treatment of sewage. Such plants comprise a tank in which the sewage is admitted and in which an aeration rotor or paddle wheel is mounted for rotation about a vertical axis in partially immersed condition. The rotor comprises substantially radial blades or paddles between inner and outer radial shrouds which subdivide the annular space between the shrouds in a plurality of guide channels which are outwardly curved in a vertical plane. When the rotor immersed in the liquid is turning, the liquid inside the guide channels will be subjected to centrifugal force and will discharge in radial, substantially horizontal direction through the outlets of the guide channels, which are situated substantially at the liquid level in the tank. This causes a suction at the entry to the guide channels situated at the bottom end of the rotor, the suction drawing more liquid continuously upwards through the guide channels, the centrifugal force lifting the liquid in the channels and discharging it horizontally outwards. The breaking up of the liquid conveyed by the rotor into separate streams by means of the guide channels of the rotor creates a turbulence on the surface of the liquid in the tank around the outer perimeter of the rotor where these separate streams are discharged, this turbulence causing an intimate contact of the discharge liquid with air which is intensively mixed with the liquid, thus promoting the aeration of the liquid, i.e. the diffusion of air or oxygen into the liquid.

The present invention has as its object the provision of a water aeration system for general use, for example for cleaning of water in lakes, rivers, beaches, and particularly along shores, by application of the above outlined aeration principle making use of an aeration rotor mounted for rotation about a vertical axis and immersed into the water to be aerated. According to the invention, this system comprises a floating carrier frame for the rotor, said carrier frame including a platform for supporting the driving motor of said aeration rotor above the water level, a driving shaft depending from the platform and connected to the rotor, a plurality of supporting rods hingedly connected to said platform and extending in radial planes outwardly and downwardly from said platform with their ends immersed in the water, and floating bodies connected to the immersed end of each supporting rod for holding said platform in floating condition above the water level with said rotor immersed for operation in the water.

The invention will now be explained with reference to the accompanying drawings in which:

FIGURE 1 is a perspective view of the aeration system according to the invention in operation;
FIGURE 2 is a partial view of the system shown in elevation and drawn to a larger scale;
FIGURE 3 is a plan view of the part of the system shown in FIG. 2;
FIGURE 4 is a sectional view of the rotor used by way of example in the aeration system.

Referring to FIGURES 1 to 3, the aeration system comprises an aeration rotor 1 suspended on a vertical shaft 4 which is driven by an electric motor 2 by the intermediary of a gear contained in the gear box 3. The rotor 1 is mounted on the shaft 4 for rotation with the shaft, but is axially movable therealong and adapted to be secured to the shaft at the appropriate level for operation in the water to be aerated.

A supporting platform 5 having the general shape of an equilateral triangle is secured to the bottom end of the stationary gear box 3. The platform 5 is integral with a downwardly extending sleeve 5' forming a guide for the shaft 4. Three supporting bars 6 are pivotally connected each to the platform 5 at one corner thereof. (In FIGS. 2 and 3, only one of the bars and its connection to the platform is indicated.) The pivot pin 7 is carried by one end of two parallel plates 8 welded to the platform 5 and traverses two straps 6' engaging the bars 6. The other end of the two plates carries a further journal pin 7' to which a screw threaded bolt 9 is pivotally connected. This bolt 9 traverses an opening provided in the end portion of the bar 6 and is rigidly connected to the bar by means of two nuts 10. By varying the position of the nuts 10 along the bolt 9 the inclination of the bar 6 with respect to the platform 5 can be varied.

The outer or lower ends of the bars 6 are immersed into the water and are each connected to a spherical floating body 12 by means of flexible connections 13, such as cables or ropes of plastic or rubber. The floating bodies 12 are formed with an outer skin 12' of plastic or thin metal sheet and are filled with a synthetic foam material 14 of the water repellant type which renders the spheres 12 insubmersible.

In order to anchor the aeration system in stationary position at the place in a waterway where its operation is desired, anchor ropes or cables 15 are attached to the floating spheres 12. The ends of the bars 6 immersed in the water may be interconnected or braced by cables or rods 16, so that the entire aeration system will form a rigid unit. A cable 17 serves to lead electric current to the motor 2.

It will be understood that the depth of immersion of the aeration rotor 1 into the liquid with respect to the liquid level 24 can be adjusted by varying the inclination of the rods 6 with respect to the horizontal. This inclination will be varied by screwing the nuts 10 upwardly or downwardly along the screw bolt 9 to cause a pivoting movement of the rod 6 about the journal pin 7.

FIG. 4 is a cross-sectional view of the aeration rotor 1 suspended on the driving shaft 4. This rotor comprises two spaced annular shrouds 17 and 18, the space between the two shrouds being subdivided by substantially radial paddles or blades 19 (FIG. 2) into a plurality of curved guide channels 20. While the rotor turns, water is drawn in from below and is lifted in the channels 20 owing to being subjected to centrifugal force, and at the outer, upper ends of the channels is expelled in radial direction substantially on the height of the water level 24. An air conduit 22 surrounding the shaft 4 opens below at 25 into each guide channel 20. The upper end of the conduit 22 communicates with the surrounding atmosphere. When the rotor 1 operates, the water flows with high velocity through the guide channels 22 and by passing the openings 25 it draws in air from above the liquid level through the conduit 22 according to the principle of the water jet pump. Thus, a water/air mixture is discharged through the outlet openings 21. A further mixture of water and air is effected beyond the outlet ends 21 owing to turbulence created in the water by the streams of water discharged from the channels 22 substantially on the height of the water level 24, and by the ends of the rotating blades 19.

An aeration rotor of the type disclosed has been described in detail in my copending application Ser. No. 593,562, and the present invention is not limited to any particular type of rotor.

The outer annular disk 17 of the rotor seen in vertical section in FIG. 4, forms a fragment of an ellipse the major axis of which is substantially horizontal and situated slightly above the entry opening 23 of the rotor, while the shorter axis extends substantially vertically downwards from the discharge opening 21. Thus, the smallest cross-sectional area of flow through the guide channels 20 of the rotor is situated slightly above the inlet 23 at the bottom of the rotor, on the level of the major axis. This particular curvature of the outer wall 17 results in an extremely favorable efficiency of operation of the rotor.

What is claimed is:

1. A water aeration system including a motor driven aeration rotor formed as paddle wheel mounted on a substantially vertical axis for at least partial immersion in the water to be aerated, wherein the improvement comprises a floating carrier frame for said rotor, said carrier frame including a platform arranged to support the driving motor of said rotor above the level of the water to be aerated, a driving shaft depending from the platform and connected to said rotor, a plurality of supporting rods hingedly connected to said platform and extending in radial planes outwardly and downwardly inclined from said platform with their ends remote from said platform immersed in the water, at least one floating body connected to the immersed end of each of said supporting rods for holding said platform in floating condition above the level of the water to be aerated with said rotor immersed for operation in the water, and means mounted on said platform and engaging the upper ends of said supporting rods for varying the inclination of said supporting rods, to thereby adjust the depth of immersion of said rotor into the liquid.

2. A water aeration system, according to claim 1, wherein a plurality of screw bolts are mounted on said platform, each of said screw bolts being engaged to the upper end of one of said supporting rods and traversing said rod at a point axially spaced from the hinge connection of said supporting rod with said platform, said screw bolts being hingedly connected to said platform, and means for adjusting the point of connection of said bolts with said rods in the axial direction of said bolts to vary the angle of inclination of said supporting rods with respect to the axis of said rotor.

3. A water aeration system according to claim 1, wherein said rotor suspended from said floating carrier frame comprises an upper and a lower annular shroud and substantially radially extending blades disposed between said shrouds for subdividing the space between said shrouds into a plurality of guide channels curved in their vertical planes to deflect the liquid entering the rotor from below outwardly and to discharge the liquid in a substantially horizontal direction through the outlets of said guide channels, said floating carrier frame holding said rotor in a position in which the outlets of said guide channels are situated substantially at the level of the water to be aerated.

References Cited

UNITED STATES PATENTS

| 162,543 | 4/1875 | Foster | 261—120 |
|---|---|---|---|
| 2,395,266 | 2/1946 | Gardner | 9—8 |
| 3,235,877 | 2/1966 | Grob | 9—8 |

HARRY B. THORNTON, Primary Examiner

S. H. MARKOWITZ, Assistant Examiner

U.S. Cl. X.R.

9—8; 239—17; 261—93